United States Patent [19]

Anson et al.

[11] 4,137,529
[45] Jan. 30, 1979

[54] CALIBRATED TUNEABLE MONITOR

[75] Inventors: James H. Anson, Auburn; David E. Steffen, Chatham, both of Ill.

[73] Assignee: Dickey-john Corporation, Auburn, Ill.

[21] Appl. No.: 497,222

[22] Filed: Aug. 14, 1974

[51] Int. Cl.² ............................................. G08B 21/00
[52] U.S. Cl. ..................................... 340/684; 340/674
[58] Field of Search ...................... 340/267 R, 259, 62, 340/271; 324/161, 166

[56] References Cited

U.S. PATENT DOCUMENTS

| 3,675,199 | 7/1972 | Jamison et al. | 340/62 |
| 3,691,462 | 9/1972 | Grundy | 324/166 |
| 3,723,989 | 3/1973 | Fathauer et al. | 340/259 |
| 3,798,529 | 3/1974 | Jones | 324/166 |

Primary Examiner—David L. Trafton

Attorney, Agent, or Firm—Olson, Trexler, Wolters, Bushnell & Fosse, Ltd.

[57] ABSTRACT

A calibrated tuneable monitor for use with multi-row planting apparatus includes means for sensing the number of seeds delivered to furrows formed in a field and controlling an indicator to give a visual readout to the operator of the planting apparatus as to whether the number of seeds planted is at least equal to a predetermined minimum value which is preset by a selector dial. The seed monitor system has a DC coupled monostable circuit for producing a pulse of given pulse width for each pulse produced by a seed sensor. The pulse from the DC coupled monostable circuit is then integrated and formed into a voltage which is proportional to the rate at which pulses are received. This voltage is then compared in a voltage comparator circuit to control the operation of an indicator.

8 Claims, 3 Drawing Figures

CALIBRATED TUNEABLE MONITOR

BACKGROUND OF THE INVENTION

This invention relates generally to monitoring systems, and more particularly to a calibrated tuneable monitor for monitoring the number of seeds planted by seed planting apparatus. The seed monitoring system disclosed herein is capable of monitoring a multitude of simultaneously planted rows.

Present day farming techniques include, among other things, the automatic planting and harvesting of large crop fields. The planting of the seeds to establish a crop field is often accomplished by driving a tractor, or other suitable vehicle, while pulling a multi-row seed dispensing device, preferably several such devices extending transversely of the direction of travel of the tractor while the seeds are continuously dispensed into a number of furrows formed in the field. While the number of rows being planted is determined by the type of equipment and size of field, it will be understood that the seed planting equipment generally used today is commonly operated in pairs. Therefore seed planting equipment may include 2, 4, 6, 8, 12 etc. seed dispensing nozzles for the rows being planted. The automatic seed dispensing equipment is generally driven by a drive wheel which is part of the planter and which receives its drive power from the tractor through a drive shaft or hydraulic system, as is well known in the art.

To assure the farmer of a relatively accurate estimate of the number of plants to be expected in the next harvest, the farmer must accurately determine the number of seeds planted during the planting season. To establish this in the past the farmer would incorporate a counter at the seed dispenser to count the number of seeds being planted. During this period of counting the farmer would manually incorporate means to calculate the distance traveled so that he could determine the area covered. After traveling a predetermined distance while planting seeds the farmer would then calculate the density of population of the seeds over the small area. If the density of population is in accordance with his prescribed yield for the particular field, the farmer may continue his planting operation without change. However, if adjustment is to be made to the planting equipment the farmer must make it at this time and take a second sample of the number of seeds dispensed during travel over another prescribed area. While being somewhat of an automatic system for the planting of seeds this arrangement does not provide means for monitoring the operation of the seeds being planted once the desired seed planting rate is obtained.

SUMMARY OF THE INVENTION

Accordingly, it is an object of this invention to provide a monitor system for monitoring the operation of multi-row seed planting equipment so that the farmer or tractor operator can at all times determine that the seed planting equipment for each row is operating properly.

Still another object of this invention is to provide a new and improved monitor which is calibrated and which can be preset to the desired seed planting rate in seeds per minute.

Briefly, the seed planting monitor of this invention includes a console to be positioned on the tractor or vehicle in full view of the operator. The console includes a series of horizontally arranged energizable lights which correspond in number to the number of rows to be planted. In the illustrated embodiment the number of lights is 12, but any number of rows can be planted between 1 and 12, with the rows not being used having their associated indicating lights disabled. The circuit is such that by removing the light bulb which is associated with the indicator it is disabled. The panel further includes an audible alarm which would signal the operator that a malfunction exists should he not be viewing the monitor panel when one or more of the indicator lamps is energized. The monitor panel further includes a high-low seed rate selector switch and a rotatable selector dial which enables the operator to select the seeds per minute at which the seed planting apparatus is to be operated. Should the seeds actually planted fall below the preset selected seed per minute rate, the indicating light on the panel will light and the audible alarm will be energized.

The circuitry utilized to operate the indicator lights includes means for changing the pulse signal information obtained by the seed sensor to a DC voltage level corresponding to the seed planting rate. This DC voltage level is then compared with a reference voltage which is controlled by the selector dial on the monitor panel. By changing the pulse signl information obtained by the seed sensor to a DC voltage the need for counting circuitry and the like is eliminated.

Many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENTS

Figure 1:
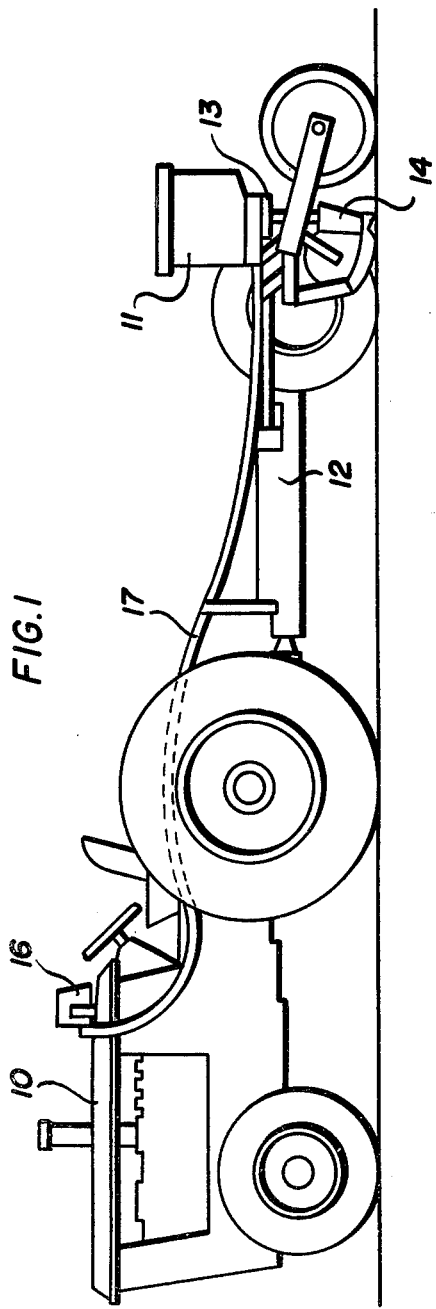
FIG. 1 is an elevational view showing a tractor pulling a seed planting apparatus and illustrating the various components necessary for operation thereof and further illustrates the use of a seed monitor constructed in accord with the principles of this invention.

Referring now to FIG. 1 the basic components of a seed planter and drive mechanism are illustrated. Here a tractor 10, or other suitable vehicle, is utilized to transport a hopper 11, or a plurality of such hoppers extending transversely of the direction of travel of the vehicle, over a field to be planted. The connection between the tractor 10 and the hopper 11 can be by any suitable arrangement, herebeing illustrated by means of a power shaft and towbar arrangement 12. The power shaft may operate a gear train or hydraulic equipment associated with the planting apparatus, as is well-known in the art. Positioned at the lower portion of the hopper 11 is a seed dispensing mechanism which directs the seeds downwardly toward the furrows formed in the field. The seed dispensing mechanism can be operated by a variable speed drive motor, such as a hydraulic motor or the like. Immediately beneath the dispenser 13 is a seed sensor 14 which produces an electrical signal in the form of a pulse for each seed actually passing through the dispenser. Therefore, electrical pulse signals are generated in response to seeds actually dispensed.

The calibrated tuneable monitor of this invention includes a console 16 mounted on the tractor to be viewed by the operator. The monitor 16 is coupled to the plurality of seed sensors of the planting apparatus by means of a control cable 17.

Figure 2:
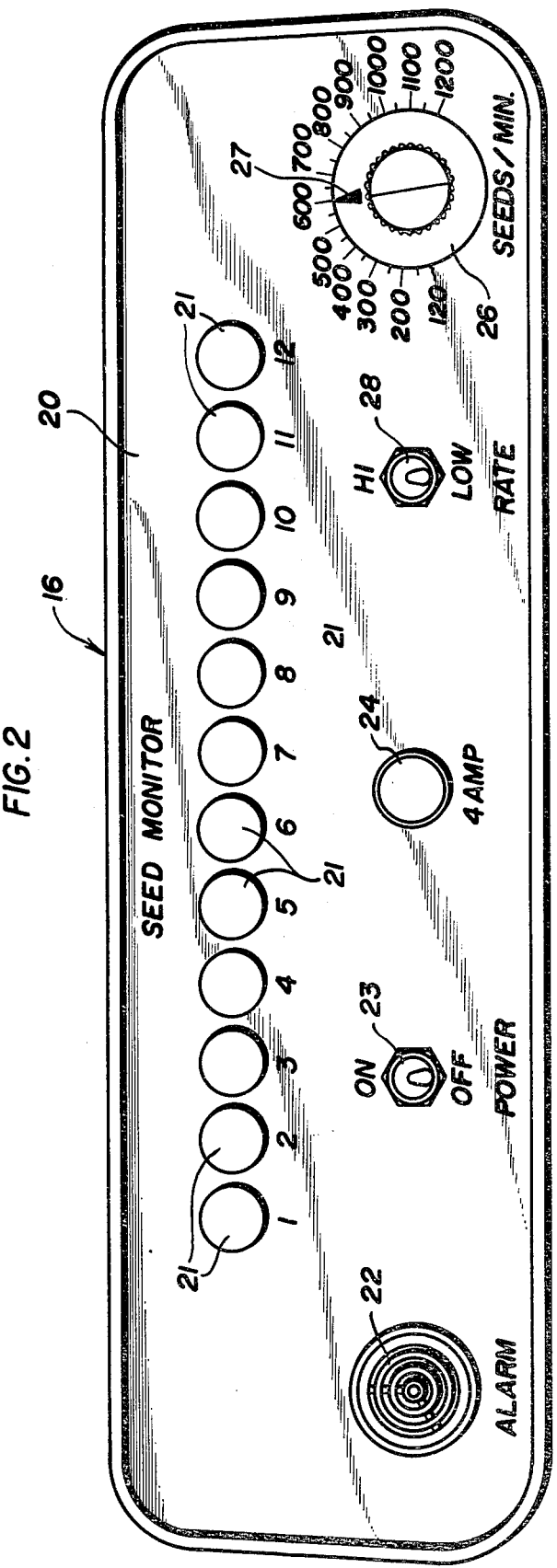
FIG. 2 is a plan view of the panel associated with the seed monitor of this invention.

The calibrated tuneable monitor 16 has a control panel 20, as best seen in FIG. 2, which includes a plurality of indicating lamps 21 aligned horizontally across the upper portion of the panel. An audible alarm 22 is also located on the panel 20, here being positioned in the lower left-hand corner. A power on-off switch 23 is provided to energize the circuitry housed within the monitor, and the circuitry is protected by a 4 amp fuse unit 24.

Most advantageously, the monitor 16 has a presettable dial 26 with a pointer 27 selectively to be positioned adjacent one of the dial setting numbers from between 120 to 1,200. These numbers represent the seeds per minute to be planted for each row of the planters associated with the planting apparatus. If the planter has 12 rows dispensing seed, as represented by the 12 indicator lights, then each of the 12 rows will be planting at the preselected seed per minute rate. If it is desirable to plant at higher seed rates a low-high switch 28 is provided. Switch 28 is coupled to a circuit which is calibrated by a factor of ten to provide the necessary multiplication factor. In the illustrated embodiment when switch 28 is in the high position the number of seeds per minute is multiplied by 10, thus indicating that between 1,200 and 12,000 seeds are being planted.

In operation, it is preferred that the operator will set the seed dispensing unit 13 to dispense the desired number of seeds per minute. After starting the tractor 10 the dial 26 is set to a low setting position of between 120 to 200. This will give an early indication of a malfunctioning row. After the tractor 10 has reached its desired maximum speed the dial 26 is turned clockwise until all the lights 21 are energized. The dial 26 is then turned counter-clockwise slightly until all lights are deenergized. The dial setting at which all the lights go out will give an indication of the number of seeds being planted. If desired, the tractor operator may turn down the dial setting one or two calibrations to operate the monitor in a go-no-go fashion. If this is the case the operator may occasionally increase the dial setting to check that the proper number of seeds are being planted. Continued proper operation of the seed planting apparatus will maintain all of the monitoring indicator lights in the de-energized state. However, should one or more of the seed planters malfunction the associated indicating light or lights will indicate which row or rows is having problems.

Figure 3:
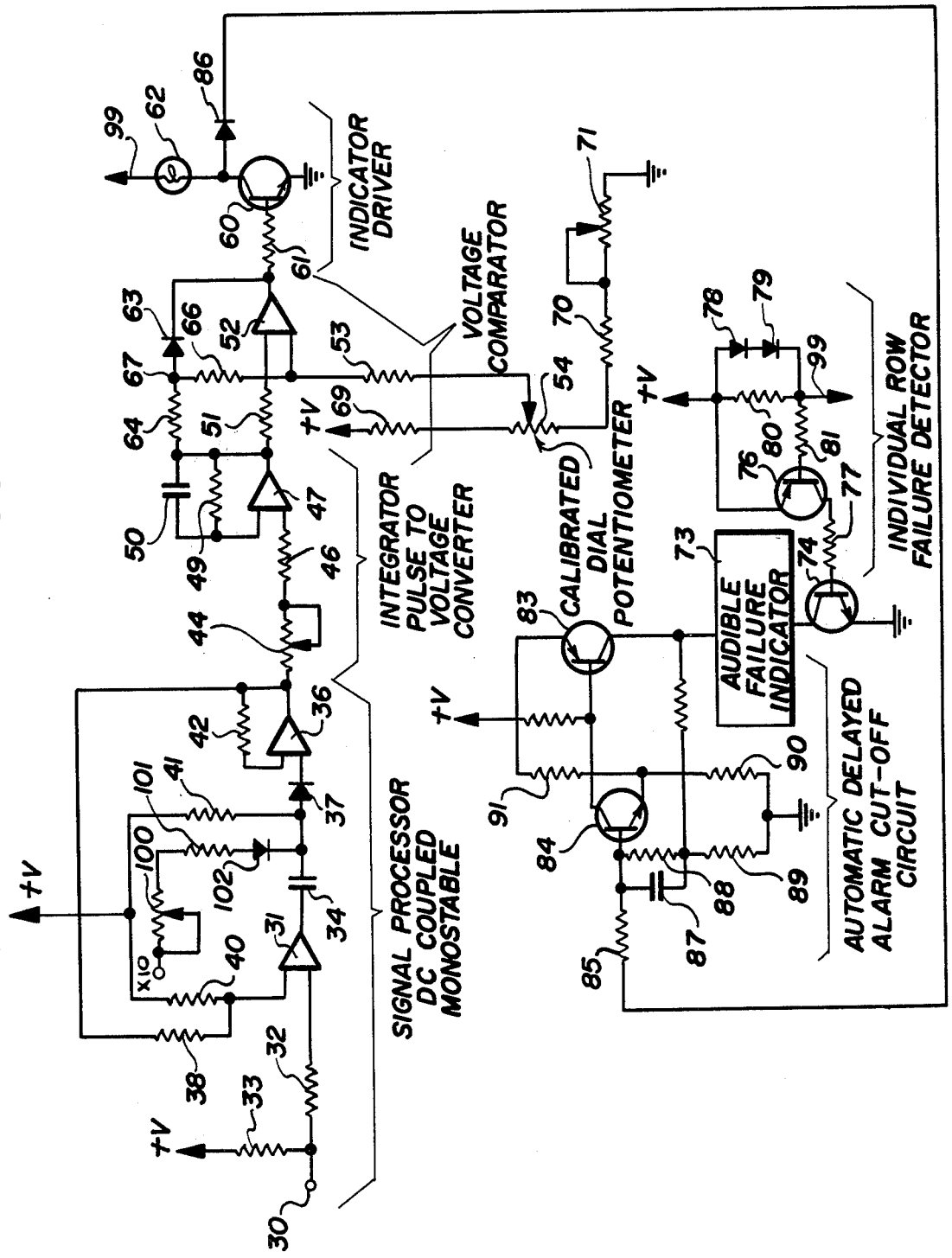
FIG. 3 is a schematic diagram of the circuitry of the seed monitor of this invention.

Referring now to FIG. 3 there is seen the detailed circuit arrangement used to control the indicating lights 21 by means of the calibrated tuneable dial 26. FIG. 3 illustrates the circuit arrangement for controlling each of the indicator lamps 21 of FIG. 2 in response to setting the seed per minute calibrated dial 26. An input terminal 30 receives pulse signal information corresponding to the number of seeds being planted, one pulse for each such seed. It will be understood that there are as many input terminals 30 and following circuits as there are rows to be monitored, here there being 12 such terminals and circuits. Since all of the circuits for each of the indicator lamps is substantially the same only a single such indicating circuit is illustrated in detail. The calibrated reference potential applied to each of the circuits is obtained from a single reference source. The pulse signal information at input terminal 30 is delivered to the plus input of an operational amplifier circuit 31 through a series resistor 32. Operating potential is applied to the operational amplifier 31 by means of a resistor 33 connected to a suitable voltage source. The output of operational amplifier 31 is coupled through a capacitor 34 to the minus input terminal of a second operational amplifier 36 through a diode 37. The output signal from operational amplifier 36 is DC coupled back to the minus input terminal of operational amplifier 31 through a series resistor element 38. A regulated voltage is also applied to the minus input terminals of each of the operational amplifiers 31 and 36 through resistors 40 and 41, respectively. The operational amplifiers 31 and 36 together with the DC coupled feedback loop including resistor 38 cause the circuit to operate as a monostable trigger circuit to produce an output pulse of predetermined pulse width regardless of the pulse width of the input signal. The output of operational amplifier 36 is also coupled back to the plus input terminal through a resistor 42. The pulse signal of predetermined pulse width is then delivered through an integrating circuit comprising an adjustable resistor 44 in series with a fixed resistance element 46 coupled to the plus input terminal of an operational amplifier 47. The output of operational amplifier 47 is fed back to the minus input terminal through an RC network comprising a resistor 49 and capacitor 50. The operational amplifier 47 together with its feedback circuit provide a pulse-to-voltage conversion and the output terminal as applied through a resistor 51 to the minus input terminal of still another operational amplifier circuit 52. The plus input terminal of operational amplifier 52 receives a reference potential through a resistor 53 which is directly coupled to the movable contact element of the calibrated dial potentiometer 54, which is connected to the tuning knob 26 of FIG. 2. When the reference potential at the plus input terminal is the same as the voltage at the minus input terminal of the operational amplifier 52 there is no control voltage applied to the base electrode of transistor 60 through the base resistor element 61. In this instance an indicating lamp 62 connected in series with the transistor is held de-energized.

The output of operational amplifier 52 is also connected to the cathode of a diode 63 which, in turn, has its anode coupled to a pair of resistors 64 and 66 tied together at a common junction point 67. The calibrated potentiometer 54 receives operating potential through a fixed resistor 69 which is coupled to any suitable regulated voltage source. The other end of potentiometer 54 is also connected to fixed resistor 70 and to a trimmer potentiometer 71 which allows calibration of the equipment either at the manufacturing site or at some time later when the equipment is in the field. Potentiometer 71 is coupled to a reference potential, here being illustrated as ground.

The circuit of FIG. 3 is provided with an audible failure indicator designated generally by reference numeral 73 and which may correspond to the audio alarm 22 of FIG. 2. The audible failure indicator 73 is connected in series with a transistor 74 which, in turn, has its base electrode connected to the collector electrode of transistor 76 through a resistor 77. Transistor 76 is foward-biased by a pair of diodes 78 and 79 connected between the base and emitter electrodes thereof and which diodes are in parallel with a resistor 80. Transistor 76 is also provided with a resistor 81 connected between its base and the junction of resistor 80 with diode 79. This junction feeds all twelve lamps 62 as indicated by arrows 99. When a failure to plant seeds at or above the selected rate is detected in any individual row, transistor 76 is rendered conductive which, in turn, renders transistor 74 conductive to actuate the audible failure indicator 73. The audible failure indicator 73 is held in a ready state by a conductive transistor 83. However, the transistor 83 is rendered nonconductive, as a result of all of the rows not planting, and the audible failure indicator will not operate. Therefore, this circuit configuration compensates for instances when the farmer is turning the planter around to plant a next group of rows adjacent to the preceding group of rows. In these instances, the transistor 83 is held conductive for a predetermined time period as set by the RC time constant associated with transistor 84. Transistor 84 has the base electrode thereof connected to the output diode 86 of the transistor 60 associated with each of the twelve lamps 62, through a resistor 85 and is rendered non-conductive after a time delay when the seed planting apparatus ceases to plant seeds during the turnaround operation. Transistor 84 has the timing circuit formed by capacitor 87 and associated resistor components 88, 89, 90 and 91. Resistor 90 forms a voltage divider network with a second resistor 91 which provides a current path between the emitter electrodes of transistors 83 and 84.

In operation, the pulse produced by the seed sensor is applied to the input of the first operational amplifier 31 and this amplifier together with operational amplifier 36 function as a DC coupled monostable circuit. The pulse width output of the DC coupled monostable circuit is constant regardless of the pulse width of the input signal. The pulse output of operational amplifier 36 is delivered to a linear integrator circuit comprising; potentiometer 44, resistor 46 and operational amplifier 47 with its associated components. The linear integrator circuit produces an output voltage which is proportional to the pulse rate received from the monostable circuit. The output of the integrator circuit is then fed to a voltage comparitor circuit comprising; a reference potential applied to resistor 69 and potentiometer 54 which, in turn, is coupled back to the plus input of operational amplifier 52. For each of the row indicator circuits the single potentiometer 54 is tied to a similar series resistor associated with its corresponding operational amplifier. The reference potential applied to potentiometer 54 is then compared with the integrator voltage applied to the negative input of operational amplifier 52. If the seed rate is below that of the dial setting then the integrator voltage is lower than that selected by the calibrated potentiometer for a reference potential. On the other hand, if the seed rate is greater than that selected on the calibrated dial the output of the comparitor is low and the indicating lamp will stay de-energized.

Resistors 64, 66 together with diode 63 determine the hysteresis characteristic of the circuit which is used to prevent continuous hunting around the selected setting. The hysteresis is triggered by a change in state of the output of the comparitor. This is then fed back to the appropriate input of the comparitor to function as a regenerative feedback for holding the circuit in the state in which it was moving. In order to make the amount of hysteresis a constant percentage of the dial setting instead of a constant seed per minute rate independent of the dial setting, the amount of feedback is regulated by connecting the feedback loop to the output of the integrator. The circuit is designed so that the change in state of the comparitor merely allows the feedback loop to become operational. The actual amount of feedback, here functioning as the hysteresis characteristic, is directly controlled by the integrator voltage which, in turn, is directly proportional to the actual seed rate being planted. Since the comparitor does not change state until the dial setting is compared with the actual seed rate, the hysteresis at the turning point is a constant percentage of the dial setting.

The indicator-driver circuit comprising transistor 60 turns on when the voltage at the comparitor goes high. The indicator-driver energizes the lamp 62 so the operator knows which row is planting seeds at the lower rate. When the seed rate at the particular row is greater than that set by the calibrated dial 26 of FIG. 2 the corresponding indicating lamp will be out.

The audible alarm sounds whenever any individual row has failed and an automatic delay cut-off is associated with the alarm after every position indicates a failure, this corresponding to a shut-down of the planter while turning to change directions. It also has the feature that any row, or rows, can be rendered inactive simply by removing the corresponding indicating lamp 62. This is particularly useful in cases of a sensor failure or when planting point rows and not all planter units are operating. This technique allows the remaining rows to be monitored and the audible alarm circuitry to be operational as usual.

A delay circuit is added to the automatic alarm cut-off after all rows have indicated a failure to allow for the possibility of a complete power drive train failure between the tractor and the planting equipment. In this case the failure would be detected after a predetermined time interval.

The circuitry illustrated in FIG. 3 has several distinct advantages over monitoring equipment for seed planting apparatus heretofore provided. For example, the circuitry is completely independent of the shape of the waveform from the seed sensor as a predetermined pulse width is formed in the monostable circuit comprising operational amplifiers 31 and 36. Therefore, any negative pulse below 4 volts will produce an appropriate pulse output for each seed planted. Furthermore, a X10 switch and potentiometer 100 is associated with the monostable circuit and is connected in series with a fixed resistor 101 and a diode 102. The X10 multiplier is incorporated by making resistors 101 and 41 close tolerance resistors or, in the alternative, by utilizing the potentiometer 100 for adjusting to the exact resistances.

What has been described in a simple and efficient monitor system which includes means for calibrating a reference potential and thereby allowing the seed per minute rate to be tuned to a selector dial on the display panel of the monitor. While only a single specific embodiment of the invention has been disclosed herein it will be understood that variations and modifications may be effected without departing from the spirit and scope of the novel concepts disclosed and claimed herein.

The invention is claimed as follows:

1. A monitor system for connection to multi-row seed planting apparatus for indicating that the rate of seeds being planted is at least equal to a predetermined rate comprising: a monitor panel, a plurality of seed sensors, each associated with one row of said multi-row seed planting appratus, first circuit means arranged for connection to each of said plurality of seed sensors to receive pulse signals for seeds being planted, indicator means on said monitor panel, and adjustable calibrated means including indicia on said panel to select and indicate said predetermined rate, said adjustable calibrated means being connected to second circuit means coupled to said first circuit means for actuating said indicator means in response to sensing a seed planting rate which is below said predetermined rate selected and indicated by said adjustable calibrated means.

2. The monitor system set forth in claim 1 wherein said indicator means includes a plurality of indicator lamps, each lamp corresponding to a row of said multi-row seed planting apparatus, wherein energization of a given lamp indicates that the seed rate planted by its associated row is below the rate selected and indicated by said calibrated means.

3. The monitor system set forth in claim 1 wherein said calibrated means enables said rate selection in seeds per minute, and wherein said indicia indicates the selected rate in seeds per minute.

4. The monitor system set forth in claim 2 wherein said indicator means includes audible indicator means responsive to energization of any one of said plurality of indicator lamps.

5. A seed planting monitor for connection to seed sensors on a seed planter, comprising: pulse forming circuit means adapted to be connected to each of the seed sensors of the planter for producing a pulse of predetermined pulse width for each seed being planted, said pulse forming circuit means providing a series of pulses at a rate corresponding to the rate at which seeds are planted, converter circuit means for producing a DC voltage having a voltage value proportional to the rate of said series of pulses, an adjustable reference potential whose value corresponds to a selected rate of seeds to be planted, adjustable calibrated means coupled to said reference potential for selecting said value and indicating the corresponding rate of seeds to be planted, comparator circuit means coupled to said converter circuit means and to said adjustable reference potential for sensing the difference between the DC voltage value of said converter circuit means and said reference potential to produce a control signal in response thereto, and indicator means coupled to said comparator circuit means for energization therefrom when said DC value is less than said reference potential, thereby indicating that the actual seed rate being planted is less than the selected seed rate as indicated by said calibrated means.

6. The seed planting monitor set forth in claim 5 wherein said seed planter is a multi-row planter and said pulse forming circuit means, said converter circuit means, said comparator circuit means and said indicator means are all plural in number, one of each being associated with each row of said multi-row planter, and each said indicator means includes an indicating lamp connected in series with a transistor, said transistor being rendered non-conductive to de-energize said indicating lamp when the seed planting rate is equal to or greater than that selected and indicated by said adjustable calibrated means, said transistor being rendered conductive to energize said indicating lamp when the seed planting rate is below that selected and indicated by said adjustable calibrated means.

7. The seed planting monitor set forth in claim 6 further including an audible failure indicator circuit coupled to the indicator means for each of the rows of the planter for giving an audible signal indication that one of the rows has failed to plant at or above the selected rate when its associated indicating lamp is energized.

8. The seed planting monitor set forth in claim 6 further including a display panel mounting said indicating lamps in a horizontal array corresponding to the arrangement of rows associated with the planter, said adjustable calibrated means comprising a selector dial on said panel, with indicia in seeds per minute, whereby seed planting rates of any row below the selected and indicated value of said selector dial will cause energization of the corresponding indicating lamp.

* * * * *